United States Patent [19]

George et al.

[11] Patent Number: 5,411,803

[45] Date of Patent: * May 2, 1995

[54] GRANULAR MATERIALS HAVING AN IMPROVED CERAMIC COATING, METHODS OF PREPARING SAME, AND COMPOSITE SHEETS INCLUDING SAME

[75] Inventors: Billy L. George, Hudson, Wis.; Donald R. Williams, Whate Bear Township, Ramsey County, Minn.; Stefan A. Babirad, Hudson, Wis.

[73] Assignee: Minnesota Mining and Manufacturing Company, St. Paul, Minn.

[*] Notice: The portion of the term of this patent subsequent to Jan. 17, 2012 has been disclaimed.

[21] Appl. No.: 945,128

[22] Filed: Sep. 15, 1992

[51] Int. Cl.$^6$ .......................... B32B 9/00; D06N 7/04
[52] U.S. Cl. ........................ 428/403; 428/404; 428/689; 428/699; 428/701; 428/702; 501/6; 501/127; 501/153; 501/154
[58] Field of Search ............... 428/404, 403, 689, 699, 428/701, 702, 141, 143; 501/6, 100, 127, 132, 134, 153, 154; 427/186, 215

[56] References Cited

U.S. PATENT DOCUMENTS

| | | | |
|---|---|---|---|
| 1,720,708 | 4/1922 | Young | 428/549 |
| 2,070,359 | 2/1937 | Hillers | 428/144 |
| 2,091,991 | 9/1937 | Jewett | 91/76 |
| 2,111,131 | 3/1938 | Weygrandt | 106/635 |
| 2,120,773 | 6/1938 | Wright | 428/404 |
| 2,225,867 | 12/1940 | Hurd | 424/635 |
| 2,547,042 | 4/1951 | Pole | 428/404 X |
| 2,981,636 | 2/1957 | Lodge et al. | 428/404 |
| 3,046,188 | 7/1962 | Gaudian et al. | 424/632 |
| 3,255,031 | 6/1966 | Lodge et al. | 428/145 |
| 3,479,201 | 11/1969 | Sloan | 428/404 X |
| 3,484,267 | 12/1969 | Salder, III | 52/518 |
| 3,494,727 | 2/1970 | Rapaport | 424/131 |
| 3,507,676 | 4/1970 | McMahon | 428/145 |
| 3,528,842 | 9/1970 | Skadulis | 428/145 |
| 3,598,627 | 8/1971 | Klimboff | 52/518 |
| 3,752,696 | 8/1973 | Beyard et al. | 428/407 X |
| 3,826,825 | 7/1974 | Dowd et al. | 424/641 |
| 3,884,706 | 5/1975 | Little | 106/18.35 |
| 3,888,176 | 6/1975 | Horai et al. | 106/18.35 |
| 3,888,682 | 6/1975 | Nelson | 106/18.35 |
| 3,888,683 | 6/1975 | Horai et al. | 106/18.35 |
| 3,888,684 | 6/1975 | Little | 106/118.35 |
| 3,894,877 | 7/1975 | Nelson | 106/18 |
| 3,985,540 | 10/1976 | Fein et al. | 504/152 |
| 3,998,644 | 12/1976 | Lodge | 106/15 R |
| 4,088,810 | 5/1978 | Lodge | 106/84 X |
| 4,092,441 | 5/1978 | Meyer et al. | 428/145 X |
| 4,359,505 | 11/1982 | Joodicke | 428/404 |
| 4,378,408 | 3/1983 | Joodicke | 428/403 |

OTHER PUBLICATIONS

Ceramic Bulletin, "Zinc Oxide", vol. 71, No. 5, pp. 821-822, 1992.

*Primary Examiner*—D. S. Nakarani
*Assistant Examiner*—H. T. Le
*Attorney, Agent, or Firm*—Ramon R. Hoch; Walter N. Kirn; Gary L. Griswold

[57] ABSTRACT

A granular material which includes an inorganic substrate and a ceramic coating shows improved adhesion to bituminous surfaces, decreased alkalinity, and, when formulated as a three coated algae-resistant granule, exhibits improved algae-resistance over previously known granules. The ceramic coating comprises the reaction product of an alkali metal silicate and an aluminosilicate, the ceramic coating further including a borate compound and zinc oxide having a particle size less than about 0.13 micrometer. It has been found that the use of a borate compound and zinc oxide having the stated particle size allows the granules to be adhered to a substrate for longer periods of time, thus producing a surface which retains its original color for a longer period of time. Methods of producing such ceramic-coated granular materials, and composite sheets including the granules are also presented.

21 Claims, No Drawings

GRANULAR MATERIALS HAVING AN IMPROVED CERAMIC COATING, METHODS OF PREPARING SAME, AND COMPOSITE SHEETS INCLUDING SAME

CROSS REFERENCE TO RELATED APPLICATIONS

This application may be related to assignee's copending application Ser. No. 07/945,127, filed Sep. 15, 1992, now allowed.

BACKGROUND OF THE INVENTION

1. Field of the Invention

This invention relates to ceramic-coated inorganic granules which exhibit improved adhesion to bituminous surfaces and which also exhibit improved alkalinity characteristics.

2. Description of Related Art

Roofing granules, both natural and artificially color-coated, find extremely wide use in roofing and siding materials. Important applications are in granular surfaced bituminous roll roofing and asphalt shingles. The granules, which are partially embedded in one surface of asphalt-impregnated and/or asphalt-coated fiber sheet material, form a coating to provide an inherently weather-resistant, fire-resistant, and decorative exterior surface. "Weather-resistant" as used herein includes ultraviolet (UV) radiation-resistant.

Skadulis (U.S. Pat. No. 3,528,842) describes roofing granules which contain an algicide, such as cuprous oxide. As explained by Skadulis, methods have long been known to artificially color roofing granules. This consists primarily of utilizing crushed and screened minerals, in which the granules are coated with a suitable pigment contained in an inorganic matrix or bond. The bond is usually applied in the form of a soluble silicate solution and is insolubized either by heat treatment or a combination of heat treatment and chemical action. This yields a substantially water-insoluble coating which is strongly adhered to the base granule. In carrying out these methods, the pigment is typically uniformly applied to the granular surface with the soluble silicate solution. The soluble silicate solution is converted to an insoluble state by heat treatment and chemical action, as by the addition of clay or an acidic material. This can occur either before, during or after the application of the soluble silicate and pigment mixture onto the mineral granules, in order to obtain a reaction between the clay or acidic material and the alkaline portion of the silicate.

U.S. Pat. No. 3,507,676 (McMahon) describes zinc-compound containing algicidal surfacing granules. The roofing granules contain either zinc metal, zinc oxide (ZnO) or zinc sulfide (ZnS), rather than copper-containing compounds patented by Skadulis. McMahon teaches the use of a pigment grade ZnO in either a first or second coating, with concentrations of about 10 grams ("gms") ZnO per kilogram ("kg") of inorganic roofing granules. McMahon noted that ZnO had been previously used in pigmented granules as an insolubization agent or pigment, but was utilized in quantities insufficient to be useful for long-term algae-resistance.

Lodge et al. (U.S. Pat. No. 3,255,031) describes the use of a small amount of a borate, such as "borax" and the like, in clay-silicate coating compositions. The addition of about 2 gms borate per kg of inorganic roofing granules apparently allows the temperature of the firing kiln to be reduced below about 450° C., and results in a roofing granule which does not need to be treated with pickling agents to insolubilize the coating. Color benefits such as "lightening" of the color of all pigmented granules and "whitening" of dark-pigmented granules are derived from the use of borate-clay-silicate coatings. Lodge et al. further disclose that borates can be used in a single coating process or in the inner or outer coating of a two layer coating system. Skadulis and McMahon also disclose that borates may be used in the processes of making ceramic-coated roofing granules.

In the preparation of ceramic-coated roofing granules it is important that the resulting granule exhibit a "low alkalinity" (defined by a test described herein). A low alkalinity is indicative of the thoroughness of insolubization of the ceramic coating. It is also important that the resulting granules adhere to bituminous surfaces, such as asphalt, with a limited degree of adhesive failure as opposed to cohesive failure of the asphalt. It would thus be advantageous if ceramic-coated roofing granules could be made to have improved adhesion while exhibiting an alkalinity which is initially low and remains low for an extended period of time. The present invention is drawn to such ceramic-coated inorganic granules, methods of making such granules, and a composite sheet body for roofing and siding which includes such granules.

Other patents which are evident of the state of the art include U.S. Pat Nos. 1,720,708; 2,070,359; 2,091,991; 2,111,131; 2,225,867; 2,981,636; 3,046,188; 3,484,267; 3,494,727; 3,507,676; 3,598,627; 3,752,696; 3,826,825; 3,884,706; 3,888,176; 3,888,682; 3,888,683; 3,888,684; 3,894,877; 3,985,540; 3,998,644; 4,088,810; 4,092,441; 4,359,505; and 4,378,408.

In particular, U.S. Pat. No. 2,111,131 discloses that small but highly effective amounts of zinc oxide may be dissolved in sodium silicate by effecting the dissolution at elevated temperatures and pressures, such as by introducing steam into an autoclave containing zinc oxide and the silicate. U.S. Pat. No. 2,225,867 discloses that the effectiveness of copper oxides (especially cuprous oxide) as an algicide is increased by the presence of zinc oxide. Furthermore, the grade of zinc oxide (i.e. purity, source, and the like) was not a factor in the efficacy of inhibiting algae growth.

Minnesota Mining and Manufacturing Company, St. Paul, Minn. ("3M") has commercialized since 1990 pigmented roofing granules known under the trade designations "LR-7000" and "LR-7070". These granules have three insolubilized silicate-clay coatings, the first two coatings each having about 35 gms cuprous oxide per kg substrate inorganic granules, with the third coating having no cuprous oxide but alternatively containing pigments to render desired color. None of the three coatings contain zinc oxide or borate.

Assignee's copending application Ser. No. 07/945,127, filed Sep. 15, 1992, describes algae-resistant granules similar to the afore-mentioned LR-7000 and LR-7070 granules. However, improvements have been made wherein color has been incorporated rendering indistinguishable algae-resistant granules to the color of corresponding non-algae-resistant granules. The granules of the latter application include zinc oxide made by the so-called French process and a borate compound in the third layer of a three layer ceramic coating.

Zinc oxide made by the so-called French process and the so-called American process are discussed in detail in Kirk-Othmer, *Encyclopedia of Chemical Technology*, Vol. 24, 3rd Ed. John Wiley & Sons (New York) pp. 854–863.

The roofing granule industry continually strives for roofing granules exhibiting improved adhesion and alkalinity characteristics. The present invention is drawn toward the use of zinc oxide made by the French process and a borate compound in a ceramic coating on roofing granules to improve the alkalinity and adhesion characteristics of the coating and resulting granule.

SUMMARY OF THE INVENTION

In accordance with the present invention, the inventors herein have found that the addition of zinc oxide made by the French process (hereinafter referred to as "ZFP") and a borate compound to the ceramic coating of a ceramic-coated inorganic granule provides a granule that exhibits excellent wet and dry adhesion to asphalt, and low 5-minute, 15-minute, and 21-hour alkalinity values. (Both the wet and dry adhesion tests, as well as the alkalinity test, are described in the Test Methods section).

The granules of the present invention may be algae-resistant or non-algae-resistant. The granules are characterized by having an inorganic substrate and a ceramic coating, the ceramic coating comprising at least one ceramic layer comprising the reaction product of an alkali metal silicate and an aluminosilicate which is reactive with the alkali metal silicate.

The granules further have from about 1 to about 5 gms zinc oxide per kg substrate granules, the zinc oxide having an average particle size less than about 0.13 micrometer, more preferably less than about 0.10 micrometer (in other words zinc oxide made by the French process, or "ZFP").

A borate compound is also present in the ceramic coating, the weight ratio of ZFP to borate compound ranging from about 0.5:1 to about 2:1, more preferably ranging from about 1:1 to about 2:1.

If the granules of the invention are desired to be algae-resistant, which is one of many preferred embodiments, the ceramic coating has three layers in which the ratio of an algae-resistant copper compound to ZFP in the first and second layers is substantially equal (within +/−5 gms), the ratio ranging from about 7:1 to about 15:1, more preferably from about 7:1 to about 10:1 in each layer. As used herein the term "copper compound" means a compound which contains cuprous ion ($Cu^{1+}$) or cupric ion ($Cu^{2+}$) and which is at least slightly soluble in water. The term is meant to include cuprous oxide, cupric oxide, cupric stearate, cupric sulfate, cupric sulfide, cuprous cyanide, cuprous thiocyannate, cuprous stannate, cupric tungstate, cuprous mercuric iodide, and cuprous silicate, or mixtures thereof. The preferred copper compound for the purposes of this invention is cuprous oxide ($Cu_2O$).

As previously mentioned, one particularly preferred granule in accordance with the invention is an algae-resistant granule which comprises:

(a) a first ceramic layer comprising the reaction product of an alkali metal silicate and a high temperature reactive aluminosilicate, copper compound, the copper compound present in an amount ranging from about 20 gms to about 40 gms per kg of substrate granules, and ZFP being present in an amount such that the weight ratio of copper compound to ZFP ranges from about 7:1 to about 15:1;

(b) a second ceramic layer which is substantially the same composition and thickness as the first ceramic layer; and (c) a third ceramic layer having a thickness which is approximately 0.25 to 0.5 times as thick as the first and second ceramic layers and comprising the reaction product of an alkali metal silicate and an aluminosilicate, ZFP, and a borate compound, the weight ratio of ZFP to borate compound ranging from about 0.5:1 to about 2:1.

It was surprising to discover that ZFP differs from pigment grade zinc oxide manufactured by the American process (hereinafter referred to as "ZAP") in terms of its efficacy in promoting adhesion, lowering alkalinity, and improving algae-resistance. Regarding algae-resistance, it has been found that ZAP (i.e. having average particle size greater than about 0.13 micrometer) actually promotes algae growth in the presence of calcium carbonate, rather than inhibit its growth, contrary to what was expected by reading the art. Surprisingly, and contrary to the teachings in the art, the granules of the present invention (employing ZFP) exhibit improved alkalinity, adhesion, and algae-resistance properties over previously known granules employing ZAP in the ceramic coatings.

If the granules of the invention are both pigmented and algae-resistant, preferably they should exhibit color parameters as compared with standard non-algae-resistant granules. This signifies that the granules are indistinguishable by the human eye from non-algicidal granules, as taught in assignee's copending application Ser. No. 07/945,127. The method of comparison utilizes Hunter's color spaces of L*, a*, and b*. For further explanation of these color spaces, see Billmeyer, F. W. and Saltman, M., *Principles of Color Technology*, 2nd Ed., John Wiley & Sons (New York) pp. 62–64 The L*, a*, and b* difference (or delta) between pigmented algae-resistant and pigmented non-algae-resistant granules should be on the order of +/−0.5. Briefly, a sample of deoiled colored granules is placed in an instrument fitted with a defined light source and the reflectance from the sample is recorded on three different color scales: "L*" which is a measure of lightness-darkness; "a*" which is a measure of red-green; and "b*" which is a measure of yellow-blue. Each scale provides a reading from 0–100, and "delta" refers to the difference between values for two different samples tested on the same instrument under standard conditions. One instrument found useful for the L*, a*, and b* values is the spectrocolorimeter known under the trade designation "Labscan 6000 Spectrocolorimeter" available from Hunter Associates Laboratory, Inc., Reston, Va. The granules of the invention have, in at least the outermost ceramic coating layer, sufficient amounts of zinc oxide and borate compounds to yield a less porous and thus more chemically durable coating, providing decreased alkalinity, increased dry and wet adhesion, and increased color-fastness (also described in the art as fade-resistance).

A further aspect of the invention comprises a composite sheet suitable for roofing or siding comprising a bituminous sheet material having a firmly adherent surfacing of granules at least a portion of which are granules of the invention described above.

Another aspect of the invention relates to a method of making the granules of the invention. The inventors herein have furthermore found that the order of addition of ingredients is critical to the success in maximizing the effectiveness of ZFP in improving adhesion and reducing alkalinity of the resultant granules. In its broadest embodiment the method comprises the steps of:

(a) providing a coatable slurry by
  (i) forming a dispersion of ZFP via agitation by combining, in order, water, an alkali metal silicate, and ZFP; and
  (ii) combining the dispersion of ZFP with an aluminosilicate and a borate compound to form a coatable slurry which is at room temperature (about 20°–30° C.);
(b) preheating a plurality of inorganic substrate granules to about 125°–140° C.;
(c) coating a plurality of preheated inorganic granules with the slurry of step (a) to form a plurality of slurry-coated inorganic granules at a temperature of about 50°–70° C.; and
(d) heating the slurry-coated inorganic granules for a time and at a temperature sufficient to form a plurality of ceramic-coated inorganic granules.

Preferred methods are those wherein the ZFP is dispersed in water and alkali metal silicate for about 24 hours before addition of the borate and aluminosilicate. Particularly preferred is the method wherein the ZFP is dissolved in water and alkali metal silicate by an autoclave method, such as disclosed by U.S. Pat. No. 2,111,131.

A particularly preferred method of making the inventive granules is one which produces a three layered algae-resistant ceramic coating, the method comprising:

(a) providing a first slurry as above described in step (a), but in addition adding a copper compound in step (a)(ii) to achieve a weight ratio of copper compound to zinc oxide ranging from about 7:1 to about 15:1;
(b) preheating a plurality of inorganic substrate granules to about 125°–140° C.;
(c) coating the first slurry onto the substrate granules of step (b) to form a plurality of first slurry-coated inorganic substrate granules at a temperature of about 50°–70° C.;
(d) heating the first slurry-coated inorganic substrate granules in an atmosphere for a time and at a temperature sufficient to form a plurality of first ceramic-coated inorganic granules;
(e) allowing the first ceramic-coated inorganic granules to reach a temperature ranging from about 125° C. to about 140° C.;
(f) coating the first slurry onto the substrate granules of step (e) to form a plurality of first slurry-coated inorganic substrate granules at a temperature of about 50°–70° C.;
(g) heating the first slurry-coated inorganic substrate granules of step (f) in an atmosphere for a time and at a temperature sufficient to form a plurality of second ceramic-coated inorganic granules;
(h) allowing the second ceramic-coated inorganic granules of step (g) to reach a temperature ranging from about 110°–120° C.;
(i) providing a second coatable slurry by
  (1) forming a dispersion of zinc oxide having an average particle size less than about 0.13 micrometer via agitation by combining, in order, water, an alkali metal silicate, and said zinc oxide having an average particle size less than about 0.13 micrometer; and
  (2) combining the dispersion with an aluminosilicate and a borate compound to form a second coatable slurry which is at room temperature (about 20°–30° C.);
(j) coating the second coated inorganic granules with the second coatable slurry to form a plurality of slurry-coated inorganic granules at a temperature of about 50°–70° C.; and
(k) heating the second slurry-coated inorganic granules for a time and at a temperature sufficient to form a plurality of third ceramic-coated inorganic granules.

It will be understood by those skilled in the art that the preheating of the inorganic granules in the methods of the invention may be done simultaneously with the production of the slurry(s) to be coated thereon.

Inorganic granules made in accordance with the teachings of the invention are highly adherent to bituminous surfaces, such as asphalt used in asphalt shingles, and have low 5-minute, 15-minute, and 21-hour alkalinity values. It is theorized that the combination borate compound and ZFP forms a less porous coating than previously known ceramic coatings, which has the surprising effect of achieving multi-purposes of increasing adhesion, decreasing alkalinity, and sustaining colorfastness when used in very small amounts as compared with similar coatings made using ZAP. In addition, ZFP does not appear to have the disadvantage of promoting growth of algae in the presence of calcium carbonate, as does ZAP. Although not completely understood, and not wishing to be bound by any particular theory, it appears that ZFP remains dispersed in the water/alkali metal silicate solution to a much greater degree than ZAP, leading to the improvements noted herein.

Further advantages of the invention will be determined by reading the description of preferred embodiments which follows.

DESCRIPTION OF PREFERRED EMBODIMENTS

Inorganic Granules

As used herein the term "granule" is used broadly and is intended to mean particles having a diameter ranging from about 425 to about 1600 micrometers. The terms "algicidal" and "algae-resistant" when referring to granules or chemicals means granules or chemicals having the capability to kill or inhibit the growth of algae commonly associated with causing discoloration of roofs and other surfaces. McMahon (U.S. Pat. No. 3,507,676) identified the dominant organism causing such discolorization as the alga *Gloeocapsa magma*. Several other strains of algae along with some fungi are also considered to be inhibited or killed by granules and/or chemicals within the meaning of the terms "algicidal" and "algae-resistant."

The zinc oxide amount and average particle size, and the amount of borate compound, in at least the outermost ceramic coating are critical aspects of the invention. The combination of ZFP with borate compounds such as borax, $Na_2B_4O_7.10H_2O$, in weight ratios of ZFP to borate ranging from about 0.5:1 to about 2:1, allows the attainment of low initial alkalinity granules (5-minute alkalinity preferably ranging from about 0.1 to about 0.3). Further, the alkalinity stays at a low value for a longer time (21-hour alkalinity ranging from about 0.3 to about 0.5) when ZFP and borate compounds are used in the coatings of the granules described herein.

Adhesion to bituminous surfaces is also improved using ZFP and borate compounds. Adhesion is described in terms of wet and dry "pick tests", which are described in detail in the Test Methods Section. The dry and wet pick values have units of percent (%), with a higher number indicating better adhesion, a low number indicating cohesive failure of the bituminous surface to which the granule is adhered, rather than adhesive failure of the granule from the surface. Preferred values for dry pick are at least about 75%, whereas for wet pick the value is at least about 50%, more preferably at least about 70%.

ZFP is typically and preferably present in at least the outermost ceramic coating layer at an amount ranging from about 1.0 gm to about 5.0 gms per kg substrate granules. It is not necessary for the borate compound to be present in the exact amount that ZFP is present; in fact, the ZFP/borate compound weight ratio can vary between about 1.0:1 and about 2.0:1, more preferably from about 1.3:1 to about 1.7:1. Most preferably the ratio is about 1.5:1.

A preferred inorganic granule in accordance with the invention is that wherein the borate compound is present at least 0.5 gm per kg of substrate granules but at no case more than about 2.5 gms per kg of substrate granules, and wherein the zinc oxide is present at least 0.5 gm per kg of substrate granules but at no case more than about 2.5 gms per kg of substrate granules.

The preferred borate compound is borax; however, other borates may be utilized, such as zinc borate, sodium fluoroborate, sodium tetraborate-pentahydrate, sodium perborate-tetrahydrate, calcium metaboratehexahydrate, potassium pentaborate, potassium tetraborate, and mixtures thereof. An alternative borate compound is sodium borosilicate obtained by heating waste borosilicate glass to a temperature sufficient to dehydrate the glass.

The preferred algicidal copper compound of the inventive granules (if the granules are to be algicidal) is cuprous oxide ($Cu_2O$), which oxidizes to the cupric (2+) state upon exposure to an aqueous reducing agent. Although it would be advantageous to use cupric oxide directly, cupric oxide is more expensive than cuprous oxide. There appears to be three colors of cuprous oxide known in the art: red, yellow, and purple. There is no preference to any of these in the present invention because cuprous oxide oxidizes to the black cupric oxide, although, of course, when a dark colored granule is desired one would preferably use the purple version of cuprous oxide.

Other useful copper compounds useful as algicides in the granules of the invention include cupric bromide, cupric oxide, cupric stearate, cupric sulfate, cupric sulfide, cuprous cyanide, cuprous thiocyannate, cuprous stannate, cupric tungstate, cuprous mercuric iodide, and cuprous silicate, or mixtures thereof.

When algicidal granules are desired, the amount of copper compound in each of the first and second ceramic coatings is an important aspect of the invention. The amount of cuprous oxide, the preferred copper compound, used in each of the first and second ceramic coatings may range from about 30 to about 40 gms per kg of inorganic substrate granule, more preferably from about 34 to about 36 gms per kg of inorganic substrate granules.

The fact that the first and second ceramic coatings have about the same amount of cuprous oxide allows for optimizing the process of supplying the granules with algicide, since the amount of algicide does not have to be changed between the first and second coating steps. Although not completely understood, it is contemplated by the inventors herein that algicidal granules having a more uniform release of algicide from their exposed surface (i.e, that portion of the granule not adhered to a surface but exposed to the environment) are achieved by this procedure.

In algicidal granules of the invention having three ceramic coating layers, all three layers preferably contain ZFP. The cuprous oxide/ZFP weight ratio may range from about 7:1 to about 15:1, more preferably from about 7:1 to about 10:1, in both the first and second layers.

The inorganic substrate granules of the invention are conventional and may be selected from any one of a rather wide class of relatively porous and weather-resistant rocks, minerals, or recycled materials. Examples of relatively porous materials are trap rocks and slates. Examples of relatively non-porous rocks or minerals are argillite or greystone (such as the large greystone deposits located north of Wausau, Wis.), greenstone, certain granites and the like. Normally, it is preferred to employ the relatively non-porous rocks, although even these rocks have a substantial porosity as compared to the ceramic coating on the inorganic substrates.

Aqueous sodium silicate is the preferred alkali metal silicate due to its availability and economy, although equivalent materials such as potassium silicate may also be substituted wholly or partially therefore. The alkali metal silicate may be designated as $M_2O:SiO_2$, where M represents an alkali metal such as sodium (Na), potassium (K), mixture of sodium and potassium, and the like. The weight ratio of $SiO_2$ to $M_2O$ preferably ranges from about 1.4:1 to about 3.75:1. Ratios of 2.75:1 and 3.22:1 are particularly preferred, depending on the color of the granular material to be produced, the former preferred when light colored granules are produced, while the latter is preferred when dark colored granules are desired.

The aluminosilicate used in the ceramic coatings is not critical but is preferably a clay having the formula $Al_2Si_2O_5(OH)_4$. Another preferred aluminosilicate is kaolin, $Al_2O_3.2SiO_2.2H_2O$, and its derivatives formed either by weathering (kaolinite), by moderate heating (dickite), or by hypogene processes (nakrite). The particle size of the clay is not critical to the invention; however, it is preferred that the clay contain not more than about 0.5 percent coarse particles (particles greater than about 0.002 millimeters in diameter). Other commercially available and useful aluminosilicate clays for use in the ceramic coating of the granules in the present invention are the aluminosilicates known under the trade designations "Dover" from W. R. Grace Chemical Company, McIntyre, Ga. and "Sno-brite" from Evans Clay Company, McIntyre, Ga.

Pigments useful in the invention include carbon black, titanium dioxide, chromium oxide, yellow iron oxide, phthalocyanine green and blue, ultramarine blue, red iron oxide, metal ferrites, and mixtures thereof. One preferred pigmented algicidal granule is a black granule wherein the pigment consists essentially of a mixture of two carbon blacks and chromium oxide, the first carbon black having an average particle size ranging from about 50 to 100 nanometers, more preferably from 70 to 80 nanometers, and the second having an average particle size ranging from about 15 to 50 nanometers, more preferably from about 20 to 30 nanometers. In these black granules the total amount of carbon black preferably ranges from about 1.0 to 2.0 gms per kg substrate granules, with the weight ratio of larger particle size to smaller particle size carbon black ranging from about 3.0 to 5.0. The amount of chromium oxide may range from about 1.25 to about 1.75 gms per kg substrate granules. One carbon black having a particle size of 25 nanometers is known under the trade designation "Black Pearls 130". A carbon black having a particle of 75 nanometers is known under the trade designation "Black Pearls 490". Both are available from the Cabot Corporation. Black algae-resistant granules which color-match with black non-algae-resistant granules are the subject of assignee's copending application Ser. No. 07/945,127.

A dispersant is typically and preferably used to disperse the carbon black or other fine particle size pigments used in the invention. One such dispersant is the sodium salt of sulfonated naphthalene-formaldehyde condensate known under the trade designation "Blancol N", available from Rhone-Poulenc Surfactants & Specialties, Cranbury, N.J. The dispersant is typically used in an amount ranging from about 0.01 to about 1.0 gm per kg of substrate granules. When a mixture of two or more carbon blacks is used, as described above, the amount of dispersant more preferably ranges from about 0.03 to about 0.1 gm per kg substrate granules.

Prior to their use on bituminous sheet materials, all granule embodiments of the invention may be post-treated to reduce dust generation during processing and to improve adhesion to the materials used in such sheets, such as asphalt. Typical treatments, though not the subject of the present invention, include oils, such as silicone oils and aqueous inorganic chemical solutions, such as solutions of magnesium chloride, and the like. One useful silicone oil is known under the trade designation "Tegosivin HL15M7" an organosiloxane silicone oil, available from Goldschmidt Chemical, Hopewell, Va. Traditionally, slate oil, such as that available from Cross Oil & Refining Co. Inc., Smackover, Ariz., has also been utilized for dust control.

Bituminous Sheet Materials

Bituminous sheet materials such as roofing shingles may be produced using the granules of the invention. Roofing shingles typically comprise materials such as felt, fiberglass, and the like. Application of a saturant or impregnant such as asphalt is essential to entirely permeate the felt or fiberglass base. Typically, applied over the impregnated base is a waterproof or water-resistant coating, such as asphaltum, upon which is then applied a surfacing of mineral granules, which completes the conventional roofing shingle.

If algae-resistant granules are used, the surface may be comprised entirely of algae-resistant granules of the invention or, more preferably, combined with non-algae-resistant granules of the invention (or previously known algae-resistant and non-algae-resistant granules) of the same or different color. The proportion of algae-resistant to non-algae-resistant granules may vary over a wide range, depending on the type of algae or fungi that is to be resisted or killed, the climate, the length of time the algicidal effect is to be, and the like. Generally, it has been found that granules of the invention have proved effective at retarding growth of algae when present on surfaces in finely divided form in amounts sufficient to provide at least about 2.0 kg per 10 square meters of roofing surface.

Methods of Making Granules

As previously mentioned, another aspect of the invention relates to a method of making the inventive granules. The inventors herein have furthermore found that the order of addition of ingredients is critical to the success of maximizing the effectiveness of ZFP in improving (increasing) adhesion of granules to asphalt and reducing alkalinity of the resultant granules.

The inventors have surprisingly found that in order to produce a granule exhibiting a 5-minute alkalinity ranging from about 0.1 to about 0.3 and a 21-hour alkalinity ranging from about 0.3 to about 0.5, and which exhibits a dry adhesion of at least about 75% and a wet adhesion of at least about 50%, the ingredients of the ceramic coatings are preferably combined in a certain order.

In particular, a coatable slurry is formed by first forming a dispersion of ZFP via agitation by combining water and an alkali metal silicate, after which ZFP is added, with a dispersant being optional. The dispersion of ZFP is then combined with an aluminosilicate and a borate compound to form a coatable slurry which is at room temperature (about 20°–30° C.).

Inorganic substrate granules, preheated to about 125°–140° C. in a rotary kiln or by equivalent means are then coated with the slurry to form a plurality of slurry-coated inorganic granules. The water flashes off as the temperature of the granules drops to about 50°–70° C. The slurry-coated granules are then heated for a time and at a temperature sufficient to form a plurality of ceramic-coated inorganic granules. Typically and preferably the slurry-coated granules are heated at a temperature of about 480° C. to about 530° C. for a time ranging from about 1 to about 10 minutes. Those skilled in the art will recognize that shorter times may be used at higher temperatures. The heat typically and preferably emanates from the combustion of a fuel, such as a hydrocarbon gas or oil. The desired color of the granules may be influenced somewhat by the combustion conditions (time, temperature, % oxygen the combustion gases, and the like).

Preferred are those methods wherein the ZFP is dispersed in water and alkali metal silicate for about 24 hours before addition of the borate and aluminosilicate. More preferably, the ZFP is dispersed in water and alkali metal silicate at temperature ranging from about 147° C. to about 186° C. and pressure ranging from about 0.3 MPa to about 1.1 MPa, and held for about 24 hours at these conditions, in accordance with the method of the aforesaid U.S. Pat. No. 2,111,131. Another preferred method is wherein algae-resistant granules are produced, as by the method mentioned above in the Summary of the Invention.

It is understood that other additives and pigments may be added to the slurries as desired, provided that the ZFP, water, and aqueous alkali metal silicate are combined first as described. The slurries are typically applied to substrate granules with a mixer such as a tumbling-barrel type of mixer.

When coating the granules with the slurries in a laboratory setting, the granules and slurry are mixed for several minutes until the granules are evenly coated with the slurry, and then the slurry-coated substrate granules are dried with warm air from a warm air gun until they have a free flowing consistency.

The invention will be further described with reference to the following Test Methods and Examples. In the following Examples, all parts and percentages are by weight unless otherwise specified.

TEST METHODS

Alkalinity Test

This test provided a measure of the unbound, soluble alkali metal content remaining in a ceramic coating made from reacting an alkali metal silicate and an aluminosilicate clay. The silicate binder reacts (when calcined at temperatures preferably at about 500° C.) with an aluminosilicate clay, and the reaction product forms a water insoluble ceramic coating. The remaining soluble alkali metal (mostly typically in the form of NaCl or other alkali metal chloride) is an indirect measure of the extent of insolubilization of the ceramic coating.

5-minute Alkalinity Test

For each test run, 100 milliliters (ml) of boiling water was poured into an Erlenmeyer flask (which had previously been boiled free of soluble alkali). 25 gms of granules to be tested were added to the boiling water as were 3 drops of phenolphthalein indicator (turning point pH=9, where "pH" is defined as the negative base ten logarithm of the hydrogen ion concentration). The water, granules and indicator were boiled for a period of 5 minutes. Decantation of the boiling water was performed into an Erlenmeyer flask. Approximately 10 ml of fresh cold distilled water was then added onto the boiled granules and swirled. The water was then added to the original boiled water that had already been decanted.

The total amount of water was then titrated to endpoint using a digital buret titration device commercially available from the Brinkmann Company. If the solution was pink immediately after addition of the indicator, that indicated the solution had a pH above 9.0, so the solution was titrated with acid, (sulfuric acid (0.1N)). If the solution was not pink immediately after addition of the indicator, the solution had a pH less than 9.0, and thus needed to be titrated to end-point using a base, (0.1N sodium hydroxide).

The ml of acid or base required to reach end-point is called the "alkalinity". The alkalinity is positive when using acid, negative when using base. To clarify this procedure, the following theoretical examples are offered:

Theoretical Example 1

100 gms of granular materials are prepared as above. The decanted solution is pink, and 1.4 ml of sulfuric acid is added to the solution to reach end-point (end-point is reached when the phenolphthalein indicator turns color from pink to clear).

The alkalinity for this example would be +1.4.

Theoretical Example 2

100 gms of granular materials are prepared as above. The decanted solution is clear, and requires 0.5 ml of sodium hydroxide to make the solution turn pink, thereby indicating endpoint.

The alkalinity of this example would be −0.50.

For granular materials of the invention, any alkalinity result between −2.0 and +2.0 is acceptable. In general, alkalinity values that are less than 0.2 units apart are considered to be essentially the same value.

15-minute Alkalinity Test

This test was identical to the 5-minute Alkalinity Test except that the water, granules, and indicator were boiled for exactly 15 minutes.

21-hour Alkalinity Test

External factors which might cause granules to become highly alkaline can result in poor adhesion. For example, when a shingle manufacturer packages shingles hot and wet and the heat is retained in a bundle of shingles, granules that are not properly neutralized can revert to the alkaline state. Thus, a granule that has an alkalinity of +2.0 (at the time of manufacturing) might develop an alkalinity of +8.0 after heating to 52° C. and high humidity. Thus, a granule which retains its 5-minute alkalinity is preferred.

The procedure for 21-hour alkalinity was similar to the 5- and 15-minute Alkalinity Tests, except that after the granules were added to the distilled water, the flask stoppered and then placed in an oven maintained at 49° C. for 21 hours. After 21 hours, the solution in each case was decanted into a clean 250 ml Erlenmeyer flask and the granules rinsed once with 10 ml of cold distilled water. The rinse water was added to the decanted solution, 3 drops of phenolphthalein added, and the solutions titrated as in the 5- and 15-minute alkalinity tests.

Adhesion Tests (Dry and Wet Pick Tests)

The pick test is a practical test to predict the adhesive characteristics of roofing granules toward asphalt. Sized granules were dropped into hot asphalt and when the asphalt had cooled to about room temperature, the granules were picked out of the asphalt. The granule surface which had been in contact with the asphalt was observed for the amount of asphalt adhering to it. If the surface of the granule was well coated with asphalt, the granule had a good "dry" pick test value. Any reading above 60% coverage of the contact surface is considered satisfactory.

Effects of water upon adhesion were obtained by submerging the asphalt-granule combination under water for 18 hours. Afterwards, observation of the percent contact surface covered by asphalt was measured. Values above the 30% are considered excellent and values above 10% are considered satisfactory.

I. Preparation of Granule

Full grade granules were screened through a #14 screen (US mesh) (average particle size of 1.4 micrometers) and those granules which remained on the screen were used in the Examples and Test Methods.

II. Preparation of Asphalt

A coating asphalt obtained from a typical mid-continent (US) crude oil was used as obtained from Richards Asphalt Co., Savage, Minn. The asphalt was heated to 176° C. in a 4.4 liter can with a loose cover until the viscosity of the asphalt was fluid. Any skin which formed on the molten asphalt surface was removed before using. Narrow strips of the fluid asphalt were poured onto a release paper and cooled to room temperature. Charred asphalt was removed by picking it from the strips of cooled asphalt.

III. Procedure of Pick Test 5 gms of prepared asphalt was placed in a can having approximate diameter of about 6 centimeters (cm). The asphalt and can were then placed in a dispatch oven at 176° C. for 10 minutes with full circulation of air. After 10 minutes the can was removed from the oven and tapped on a table top once to remove air bubbles. Granules to be tested were then sprinkled onto the top surface of the asphalt in the can from a height of 30.5 cm or more. The can was tapped on a table top three times to help embed the granules in the asphalt. The can, asphalt, and granules were then left undisturbed and allowed to cool to room temperature (approximately 0.5 hour).

The granules were first picked out of the cooled asphalt on a dry basis. Only those granules which were embedded well were examined. A picked granule was examined to estimate the amount of asphalt that was adhered to it. The estimate used a scale of 0–10, with "0" meaning no asphalt adhered to the granule and "10" meaning that the part of the granule embedded in the asphalt was completely covered. Ten granules were picked out of the asphalt for each of the 3 different times (dry, 2 hours, and 18 hours) and their total recorded in percent.

For the wet pick test, the procedure was to submerge the granule covered asphalt in the same can for two hours under 0.64 cm distilled water at room temperature. The granules were then re-evaluated. The experiment is repeated for an additional 16 hours, and the granules further re-evaluated.

When performing the pick test it was sometimes noted that the asphalt had a tendency to crack or break around the base of the granule. When this occurred, the test result was ignored. In some cases, especially when performing the wet pick tests, the can was held next to a microscope light for about 10 seconds (on the lid) and 12–13 seconds (on the bottom) to slightly warm the asphalt and prevent cracking.

MATERIALS DESCRIPTION

The following materials are used in the Examples which follow:

$Cu_2O$ is cuprous oxide, available from American Cemet, Inc.

$Cr_2O_3$ is chromium oxide, available from American Cemet, Inc.

$TiO_2$ is titanium dioxide, available from Kerr-McGee Chemical Corporation, Oklahoma City, Okla.

ZnO is zinc oxide made by the French process, available from Zinc Corporation of America, Monaca, Pa.

Borax is $Na_2B_4O_7 \cdot 10H_2O$, commercially available from Harcros Chemical, Inc., Little Rock, Ark.

Kaolin clay is about 46% $SiO_2$, 1.33% $Fe_2O_3$, 0.75% $TiO_2$, and 36% $Al_2O_3$, with traces of calcium oxide, magnesium oxide, sodium oxide, and potassium oxide, and is available from Evans Clay Co., Summit, N.J.

Dover clay is a clay reactive with alkali metal silicate solutions having composition $Al_2(Si_2O_5)(OH)_4$, available form W. R. Grace, McIntyre, Ga.

CB490 is carbon black known under the trade designation "Black Pearls 490", from Cabot Corp.

CB130 is carbon black known under the trade designation "Black Pearls 130", from Cabot Corp.

"Blancol N" is the trade designation for the sodium salt of sulfonated naphthalene-formaldehyde condensate available from Rhone-Poulenc Surfactants & Specialties, Cranbury, N.J.

"Tegosivin HL15M7" is an organosiloxane silicone oil, available from Goldschmidt Chemical, Hopewell, Va.

Slate oil, available from Cross Oil & Refining Co. Inc., Smackover, Ark.;

0.1N sulfuric acid and 0.1N sodium hydroxide are available from American Scientific Products, Minneapolis, Minn.

PROCEDURE FOR COATING GRANULES

The procedure used in the following examples for coating the granular materials of the invention and the comparative examples was as follows:

A dispersion of ZFP was mixed using 60 parts aqueous sodium silicate solution (39.4% solids, 2.75 ratio $SiO_2$ to $Na_2O$), and 20 parts water. The dispersion was formed by the autoclave method of U.S. Pat. No. 2,111,131, as described above, and the dispersion held for 24 hours at a temperature of about 160° C. and pressure of about 1 MPa. A slurry was then formed by combining the still hot dispersion, 25 parts kaolin clay, and 15 parts titanium dioxide. In each case the slurry was mixed in a mixer at room temperature with a laboratory scale mixer for about 10 minutes. Grade #11 greystone granules ($-10/+35$ US mesh size) granules (i.e. 1065 micrometers average particle size) were preheated to 113° C. while tumbling through a rotary kiln at a rate of about 908 kg per hour. The slurry was then coated onto the preheated granules at a rate of about 900 kg per hour by mixing the preheated granules and slurry in the mixer. The first slurry-coated granules were then transferred to a rotary kiln and fired at 510° C. for about 2 minutes.

EXAMPLES

Example 1 and Comparative Examples A and B

For Example 1, a coating precursor slurry was prepared by mixing in a slurry pot with agitation the slurry formed in PROCEDURE FOR COATING GRANULES, 3.0 parts ZFP, and 2.0 parts borax. 2000 parts of granules as described in the PROCEDURE FOR COATING GRANULES were coated with the coating precursor slurry in a rotary mixer and then dried with a heated air gun while still in the mixer. The granules were then transferred to a rotary firing pot and fired to 510° C. for about 2 minutes, and then cooled to 100° C. in a rotary cooler, then treated with 6 and 0.2 parts slate oil and silicone, respectively.

For Comparative Example A, a similar second coatable slurry precursor solution was prepared, only no ZFP was added.

For Comparative Example B, a similar second coatable slurry precursor solution was prepared, only no ZFP or borax was added.

The alkalinity and adhesion test results for granules made in accordance with Example 1 and Comparative Examples A and B were as follows (all alkalinity values were "+"):

|  | Ex. 1 | Ex. A | Ex. B |
| --- | --- | --- | --- |
| 5-min. alk. | 0.26 | 0.9 | 1.1 |
| 15-min. alk. | 0.44 | 1.5 | 1.6 |
| 21-hour alk. | 0.46 | 1.8 | 2.0 |

-continued

|          | Ex. 1 | Ex. A | Ex. B |
|----------|-------|-------|-------|
| dry pick | 88    | 83    | 79    |
| wet pick | 72    | 29    | 22    |

Various modifications and alterations of this invention will become apparent to those skilled in the art without departing from the scope of the invention, and it should be understood that this invention is not to be unduly limited to the illustrated embodiments set forth herein.

What is claimed is:

1. An inorganic granule comprising an inorganic substrate and a ceramic coating thereon, said ceramic coating comprising at least one ceramic layer comprising a reaction product of an alkali metal silicate and an aluminosilicate which is reactive with said alkali metal silicate, from about 1 to about 5 grams zinc oxide made by French process per kilogram of inorganic substrate, said zinc oxide having an average particle size less than about 0.13 micrometer, and a borate compound, said zinc oxide having an average particle size less than about 0.13 micrometer and said borate compound being contained in a weight ratio ranging from about 0.5:1 to about 2:1.

2. Granule in accordance with claim 1 wherein said ceramic coating is a single ceramic layer.

3. Granule in accordance with claim 1 wherein said ceramic coating comprises first, second and third ceramic layers, said third ceramic layer being outermost and having a same composition as said at least one ceramic layer.

4. Granule in accordance with claim 3 wherein said first ceramic layer comprises a reaction product of an alkali metal silicate and an aluminosilicate, a copper compound, said copper compound present in an amount ranging from about 20 grams to about 40 grams per kilogram of inorganic substrate, and said zinc oxide having an average particle size less than about 0.13 micrometer and copper compound being contained in a weight ratio ranging from about 7:1 to about 15:1; and wherein said second ceramic layer has substantially a same composition as said first ceramic layer.

5. Granule in accordance with claim 4 which includes a pigment in said at least one layer, said pigment selected from a group consisting of carbon black, titanium dioxide, chromium oxide, yellow iron oxide, phthalocyanine green, red iron oxide, metal ferrites, and mixtures thereof.

6. Granule in accordance with claim 4 which further includes a silicone oil on said second ceramic layer.

7. Granule in accordance with claim 4 wherein the copper compound is cuprous oxide.

8. Granule in accordance with claim 1 wherein said alkali metal silicate comprises $Na_2O:SiO_2$ having a weight ratio of $SiO_2$ to $Na_2O$ ranging from about 1.4:1 to about 3.75:1.

9. Granule in accordance with claim 1 which includes a pigment in said at least one layer, said pigment selected from a group consisting of carbon black, titanium dioxide, chromium oxide, yellow iron oxide, phthalocyanine green, red iron oxide, metal ferrites, and mixtures thereof.

10. Granule in accordance with claim 1 which exhibits a 5-minute alkalinity ranging from about 0.1 to about 0.3 and a 21-hour alkalinity ranging from about 0.3 to about 0.5.

11. Granule in accordance with claim 1 which exhibits a dry adhesion of at least about 75% and a wet adhesion of at least about 50%.

12. Granule in accordance with claim 1 wherein said borate compound is borax.

13. Granule in accordance with claim 1 which further includes a silicone oil.

14. An algae-resistant granule comprising an inorganic substrate and a ceramic coating thereon, said ceramic coating comprising:
   (a) a first ceramic layer comprising:
      (i) a reaction product of an alkali metal silicate and an aluminosilicate,
      (ii) a copper compound, said copper compound present in an amount ranging from about 20 grams to about 40 grams per kilogram of inorganic substrate, and
      (iii) zinc oxide made by French process having an average particle size less than about 0.13 micrometer, said zinc oxide and said copper compound being contained in a weight ratio ranging from about 7:1 to about 15:1;
   (b) a second ceramic layer having substantially a same composition and thickness as said first ceramic layer;
   (c) a third ceramic layer having a thickness which is approximately 0.25 to 0.5 times as thick as said first and second ceramic layers, said third layer comprising
      (i) a reaction product of an alkali metal silicate and an aluminosilicate,
      (ii) zinc oxide having an average particle size less than about 0.13 micrometer, and a borate compound, said zinc oxide having an average particle size less than about 0.13 micrometer and said borate compound being contained in a weight ratio ranging from about 0.5:1 to about 2:1.

15. Granule in accordance with claim 14 wherein said weight ratio of said copper compound to said zinc oxide having an average particle size less than about 0.13 micrometer ranges from about 7:1 to about 10:1.

16. Granule in accordance with claim 14 wherein said borate compound is borax and said weight ratio of said zinc oxide having an average particle size less than about 0.13 micrometer to borax ranges from about 1.3:1 to about 1.7:1.

17. Granule in accordance with claim 14 wherein said alkali metal silicate comprises $Na_2O:SiO_2$ having a weight ratio of $SiO_2$ to $Na_2O$ ranging from about 1.4:1 to about 3.75:1.

18. Granule in accordance with claim 14 wherein said third ceramic layer includes a pigment selected from the group consisting of carbon black, titanium dioxide, chromium oxide, yellow iron oxide, phthalocyanine green, red iron oxide, metal ferrites, and mixtures thereof.

19. Granule in accordance with claim 14 which further includes a silicone oil on said third ceramic layer.

20. Granule in accordance with claim 14 which exhibits a 5-minute alkalinity ranging from about 0.1 to about 0.3 and a 21-hour alkalinity ranging from about 0.3 to about 0.5.

21. Granule in accordance with claim 14 which exhibits a dry adhesion of at least about 75% and a wet adhesion of at least about 50%.

* * * * *